US006546170B1

United States Patent

Eyal et al.

(10) Patent No.: US 6,546,170 B1
(45) Date of Patent: Apr. 8, 2003

(54) DEVICES AND METHODS FOR REDUCING DISPERSION IN OPTICAL COMMUNICATIONS

(75) Inventors: Avishay Eyal, Pasadena, CA (US); Anthony S. Kewitsch, Santa Monica, CA (US); George A. Rakuljic, Santa Monica, CA (US)

(73) Assignee: Arroyo Optics, Inc., Santa Monica, CA (US)

( * ) Notice: Subject to any disclaimer, the term of this patent is extended or adjusted under 35 U.S.C. 154(b) by 203 days.

(21) Appl. No.: 09/799,089

(22) Filed: Mar. 6, 2001

Related U.S. Application Data

(60) Provisional application No. 60/187,324, filed on Mar. 6, 2000.

(51) Int. Cl.[7] .................................................. G02B 6/42
(52) U.S. Cl. ........................... 385/43; 385/37; 385/95; 385/96; 385/4; 385/129; 65/385; 65/378
(58) Field of Search ...................... 385/43, 37, 95–96, 385/4, 11, 1, 129, 130, 131, 50, 28, 7; 65/385, 378; 359/237

(56) References Cited

U.S. PATENT DOCUMENTS

| 5,321,777 | A | * | 6/1994 | Hicks et al. ................... 385/4 |
| 5,386,490 | A | | 1/1995 | Pan |
| 5,550,948 | A | * | 8/1996 | Inniss et al. ................. 385/147 |
| 5,805,751 | A | * | 9/1998 | Kewitsch et al. ............. 385/43 |
| 6,422,084 | B1 | * | 7/2002 | Fernald et al. ................ 73/705 |

FOREIGN PATENT DOCUMENTS

EP 0559174 B1 9/1993

OTHER PUBLICATIONS

Birks, T.A., "Twist Induced Tuning in Tapered Fiber Couplers," Applied Optics, vol. 24 (No. 19), p. 4226–4233, (Oct. 2, 1989).

Derickson, D., "Fiber Optic Test and Measurement," Prentice Hall (Upper Saddle River, NJ), p. 220–245, (Jun. 2, 1998).

\* cited by examiner

Primary Examiner—Robert H. Kim
Assistant Examiner—George Wang
(74) Attorney, Agent, or Firm—Jones, Tullar & Cooper, PC

(57) ABSTRACT

Asymmetric grating assisted couplers present unique problems if dispersion is to be reduced to levels at which high data rate signals can be transmitted. To overcome these problems, the method of the present invention includes precisely controlling and monitoring the cross-sectional geometry of the coupler during stretching and fusing. By monitoring states of polarization in lowest order modes as the coupler is formed, coupler fusion can be terminated when optimum form birefringence minimizing PMD is achieved. Dispersion is further minimized by impressing a saturated index of refraction grating with substantially flat add/drop characteristics in the coupler, and introducing a controlled amount of twist.

4 Claims, 8 Drawing Sheets

The Poincare sphere representation of polarized light.

The Differential Group Delay in a twisted coupler as function of the number of turns The maximum dispersion in the passband as function of the grating amplitude Retardation evolution during the fusion process.

The intensity and phase responses of the untwisted coupler

The intensity and phase responses of the 10 turns twisted coupler

Even y-polarized ($LP_{11}^{ey}$), even x-polarized ($LP_{11}^{ex}$), odd y-polarized ($LP_{11}^{ey}$) and odd x-polarized ($LP_{11}^{ex}$) $LP_{11}$ modes $LP_{11}^{ey}$ $LP_{11}^{ex}$ $LP_{11}^{ey}$ $LP_{11}^{ex}$

DEVICES AND METHODS FOR REDUCING DISPERSION IN OPTICAL COMMUNICATIONS

REFERENCES TO PRIOR APPLICATIONS

This application relies for priority on a prior filed provisional application entitled "Devices and Methods for Reducing Dispersion in Optical Communications" filed Mar. 6, 2000, Ser. No. 60/187,324 by Avishay Eyal, Anthony S. Kewitsch and George A. Rakuljic.

FIELD OF THE INVENTION

This invention relates to systems and methods for communication using optical networks, and more particularly to problems of minimizing polarization mode dispersion and chromatic dispersion in asymmetric grating assisted devices.

BACKGROUND OF THE INVENTION

In optical networks, in which long distance optical fiber-based transmission systems are required to transmit signals at high (e.g. Gigabit) data rates, seemingly minor or minute physical or optical variants from the ideal can introduce anomalies which substantially degrade system capabilities. Most of these relate to dispersion, the tendency of optical waves or signals to separate or shift during propagation. One such anomaly pertains to an effect termed polarization mode dispersion (PMD). This effect derives ultimately from the fact that optical fibers, in practice, have birefringent properties and their refractive indices are polarization dependent. The birefringence in long length single mode fibers, for example, results from deviation of the fiber core from circular symmetry, from the presence of intrinsic and extrinsic stresses, and from curvature in the fiber along its length. In consequence of the polarization dependence, optical waves which are transmitted with different initial polarizations are subject to varying amounts of group propagation delays, the time differential between group delays increasing with propagation distance.

A different but generally related problem in optical systems is that of achieving polarization independence, so that a device which exhibits birefringence responds identically regardless of input signal polarization. In a previously filed application that is assigned to the assignee of the present invention, entitled "Methods of Fabricating Grating Assisted Coupler Device", by A. S. Kewitsch et al., Ser. No. 09/128/476, filed Aug. 4, 1998, now U.S. Pat. No. 6,169,830 B1, different techniques are disclosed for achieving polarization independence in a merged fiber, grating assisted coupler device such as an add/drop filter. One of these techniques employs twisting of the merged region about its longitudinal axis, which collapses the drop wavelengths of different polarizations to generate a common, polarization independent, drop passband. This is effective for a coupler that is useful as an add/drop filter and for other purposes. Twisting a coupler also can be useful to vary the power splitting ratio between outputs of a fused single mode fiber coupler, as described by T. A. Birks in an article entitled "Twist-Induced Tuning in Tapered Fiber Couplers", in Applied Optics, Vol. 24, No. 19, 1 Oct. 1989, pp. 4226–4233.

The device described by Kewitsch et al. is non-evanescent and operates in a reflection mode to provide wavelength selectivity with high efficiency (the Birks coupler is evanescent and splits power without a recorded grating). Because of its low loss operation capabilities for add/drop operations at selected wavelengths, this approach satisfies basic requirements for many advanced optical fiber based systems. However, new performance targets are constantly being set, one of these arising from a demand for ever increasing data rates. Most current work is directed toward achieving data rates at 10 to 50 Gbs. While higher data rates are achievable because of the short wavelength of light, the effects of PMD are increasingly more severe, since differential group delays progressively degrade the closely spaced signal transitions at higher frequencies.

In grating assisted couplers, including the type mentioned above, the presence of a grating inherently introduces a non-linear dependence of phase response on wavelength. This non-linear phase response, together with non-circularity in the cross-section of the merged fibers in the region in which the grating is written, may raise the effect of PMD to several orders of magnitude higher than that inherent in the fiber itself. There are cross-sectional shapes (such as an ellipse with particular ellipticity) which result in low PMD; however, the shape tolerances necessary to achieve this reduction are impractical. For example the two merged fibers typically define a peanut or dumbbell shape, with one side of the merged region being larger than the other, pursuant to the non-evanescent coupler concept. In practice, precisely monitoring the elliptical shape in a manufacturing environment is extremely difficult and a need exists for other remedies. An internal grating coextensive with both fibers reflects signals of a selected wavelength from one fiber back along the other. In addition, as disclosed by Kewitsch et al., elliptical fiber geometries are formed during the initial drawing, such that $LP_{01}$ and $LP_{11}$ modes exhibit nearly equal and opposite birefringence. This corresponds to the general condition needed for polarization independence in the drop signal. However, taken together with the dispersion produced by the grating, the birefringence introduces high PMD. It is increasingly desirable further to minimize the PMD in the reflected (drop) channel, but to do so without diminishing the other advantageous properties of the coupler. A dispersion of less than about 1 ps over a 50 nm wavelength is a desirable objective.

In photonic add/drop couplers such as those discussed, chromatic dispersion (CD) also is a potential problem to be reduced to levels at which WDM signals at high data rates will not be degraded. The chromatic dispersion response is preferably to be held within 100 ps/nm in peak to peak amplitude over the add/drop passband, a property which has heretofore not consistently been achieved. Minimization of CD also contributes to minimization of PMD.

SUMMARY OF THE INVENTION

A grating assisted reflection mode coupler in accordance with the invention is non-evanescent and asymmetric, and establishes reflected light modes which are orthogonally polarized and have different wavelength shifted reflection amplitude and phase responses. In accordance with the invention, the various advantageous interactions and relationships of the coupler are not altered, but a number of controls are utilized during and after the formation of the grating-confining section and in the writing of the grating itself to minimize PMD and CD as well.

In the process of forming the fused fiber coupler waist by tension and a lengthwise reciprocating heat source, such as a torch, the states of polarization of light at different times through the fibers are monitored directly. At least three different states of polarization in the waist are sensed for each of the two lowest order modes, and from these readings the angles of rotation of the two lowest order modes on the Poincare sphere are determined. The heat and tension parameters are controlled to maintain a final condition in which the angles are equal and of opposite sign. When this occurs, the heat is reduced to a level at which the viscosity is sufficiently high for the shape of the waist to be preserved during subsequent elongation. At this point, the coupler not only has achieved a polarization independent state but one in which PMD has been minimized. To further minimize PMD while providing low CD, a saturated grating with substantially flat add/drop characteristics is written, such that the CD response within the add/drop passband varies less than 100 ps/nm in peak to peak amplitude. The additive benefits of angular displacement (twist) about the length of the waist region also can be utilized, to provide a PMD of equal to or less than 1 ps in add/drop response over a 50 nm wavelength span.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Dispersion Problems in Grating Assisted Couplers

The methods described here are directed to reduction of Chromatic Dispersion (CD) and Polarization Mode Dispersion (PMD) in grating assisted couplers. The magnitude of PMD in grating assisted couplers is proportional to the birefringence-induced splitting in the grating transmission/reflection response and also to the amount of Chromatic Dispersion in the grating. Thus, a reduction in PMD can be achieved by reducing either or both of these physical causes.

The coupler of particular interest that is described in the Kewitsch et al. patent is produced by fusing two dissimilar fibers into a single waveguide in the coupling region. To achieve the needed dissimilarity one of the fibers is stretched (tapered) at its center prior to the fusion stage. Before the grating is impressed the coupler is essentially a transparent device with two optically independent channels and each of the channels corresponds to a different waveguide mode of the coupler waist. In this prior patent, methods for minimizing the polarization dependence of the coupler are described. The term 'polarization dependence' as referred to in that patent is the dependence of the center wavelength of the drop channel on the state of polarization of the incoming light. Both PMD and the intensity polarization dependence are directly related to the birefringence-induced polarization splitting and can be reduced together to some degree.

The presence of birefringence in the coupler waist causes different polarization states to experience different phase retardations. The maximum retardation-difference (commonly referred to simply as 'the retardation') is proportional to the birefringence and is measured in radians. Reduction in birefringence-induced splitting can be achieved by careful control of the fabrication process so that the retardations seen by the two lowest waveguide modes are equal and opposite. To that end the retardations are continuously measured during the fabrication of the coupler and the results are used to control the process.

Figure 6:
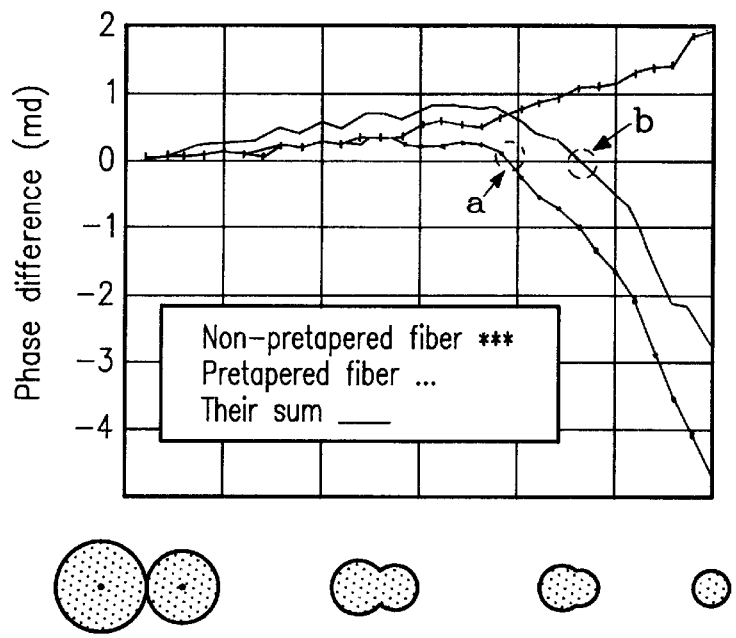
FIG. 6 is a diagram of polarization phase differences (retardation angle) for optical signals traveling through an asymmetric, grating assisted coupler, in relation to coupler cross-section.
Figure 6:
Figure 7:
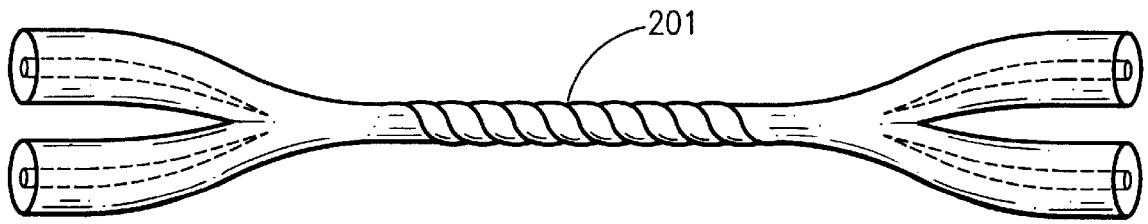
FIG. 7 is an idealized perspective view of the waist region of a grating assisted coupler having a twist imparted thereto.

An example for the evolution of the retardations during the fabrication of the two channels of the coupler is depicted in FIG. 6. The condition for minimizing the splitting and hence reducing the coupler PMD is satisfied in point b (FIG. 6) where the retardations of the two channels are equal and opposite. In order to produce a low PMD coupler the process needs to be controlled so that it will end as close as possible to this point. This can be achieved by adjusting the temperature of the heat source that is used for fusing the fibers.

Two major processes occur during the fabrication of the coupler: the two fibers are merged into a single waveguide and at the same time they are stretched so that the coupler waist becomes increasingly thinner. The rate at which these processes evolve is dependent mainly on the fusion temperature and the pulling force. The results of the retardation measurements are used as inputs to the computer program which controls the temperature of the heat source so that the rate of the fiber's merging is slowed while keeping the stretching rate constant. This, in turn, enables controlling the form of the cross section of the coupler waist so that at the end of the fabrication process the birefringence of the two channels will be equal and opposite as in point b in FIG. 6.

The reduction of PMD beyond the teaching of the prior patent, however, requires a more careful control over the coupler birefringence and a further optimization of twist, in a manner to minimize PMD to the levels necessary for present and near future communication applications.

Fabrication System and Method

Figure 1:
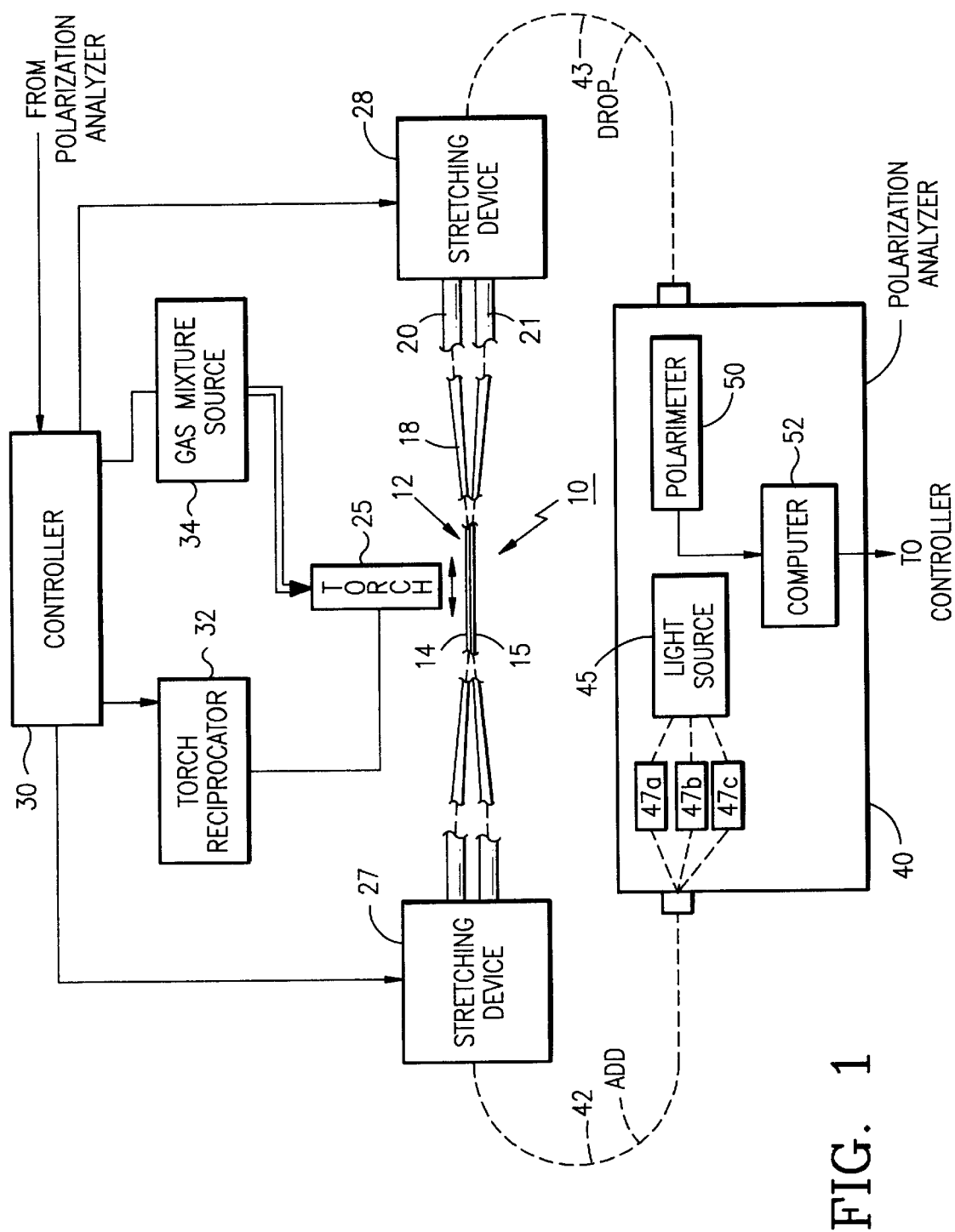
FIG. 1 is a simplified diagrammatic representation of a system including a workstation and polarization analyzer for use in methods in accordance with the invention.
Figure 5:
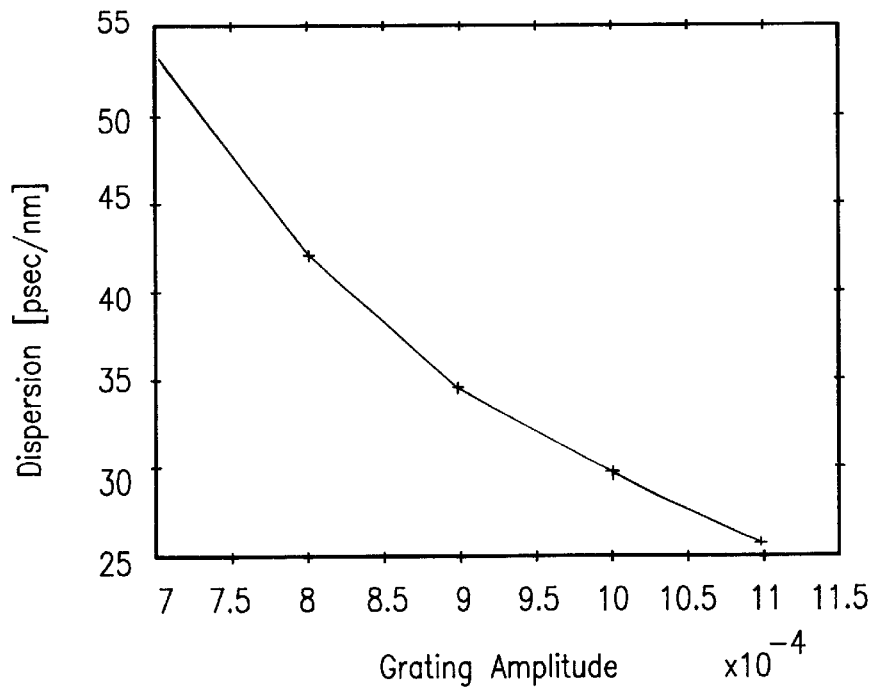
FIG. 5 is a graph of maximum dispersion in the passband of a coupler as a function of the passband of the recorded index of refraction grating modulation.

A system for fabricating a coupler 10 by forming a precise waist region 12 comprising differently sized fused fibers 14, 15 along a waist length joined by adiabatic tapers 18 to conventional core/cladding fibers 20, 21 is shown in FIG. 1. the fiber segments are greatly exaggerated in size for clarity. The system is presented largely in generalized form, since computer-controlled optical fiber stretching systems or workstations are commercially available, although elements and relationships contributing to the method are shown in greater detail. These systems deploy a reciprocating torch 25 adjacent the predetermined waist region 12, and tension the fibers 20, 21 by controllable stretching devices 27, 28. A controller 30, operating in response to parameter control signals provided by a polarization analyzer, described below, determines the tension to be exerted by one or both stretching devices 27, 28. It also controls the rate and span of movement of the torch 25 along the fibers that is imparted by a reciprocator 32, and the gas mixture that is supplied to the torch 25 by a source 34, so as to control the temperature of the flame. The torch 25 may also be configured to be retractable from the fiber 12. By moving the flame in scans of increasing length along the fibers the glass of the fibers becomes sufficiently plastic, locally, starting in the scan center for the fibers to elongate and fuse together, as shown by the successive cross-sections in FIG. 5. This develops the desired waist region 12 in which the small diameter fibers 14, 15 are fused together, typically over a 4–10 cm length, and from which they divide at each end into the formed adiabatic taper segments 18 merging into the optical fiber lengths 20.21 of nominal diameter.

The system also incorporates a polarization analyzer 40 that is coupled in a loop formed between the add line 42 and drop line 43, respectively, from the coupler 10. A light source (laser) 45 transmits light of a selected wavelength successively through separate polarizers 47a, 47b and 47c which have arbitrary but different states of polarization (SOP). This light, input into the add line 42, passes through the waist region 12, then through the drop line 43 to a polarimeter 50 in the polarization analyzer 40, the readings from which are processed by a computer 52 into parameter control signals for the workstation controller 30. The three known input states of polarization and the measured output states enable the polarization transmission matrix, known as the "Jones matrix" to be calculated, from which retardation can be established.

Polarization analyzers and their uses are discussed in detail in Chap. 6, pp. 220–245, "Polarization Measurements" (by Paul Hernday) of the book entitled "Fiber Optic Test and Measurement" edited by Dennis Derickson, and published by Hewlett-Packard Company/Prentice Hall PRT (N.J.), 1998. this publication treats various subjects referred to hereafter, such as states of polarization, the Jones calculus, the Poincare sphere, polarimeters, polarization analyzers and retardance measurements, in some detail. Consequently those skilled in the art can refer to the Chapter 6 treatment and the references cited for further explanation of underlying considerations and techniques and they need not be elaborated upon here.

Figure 2:
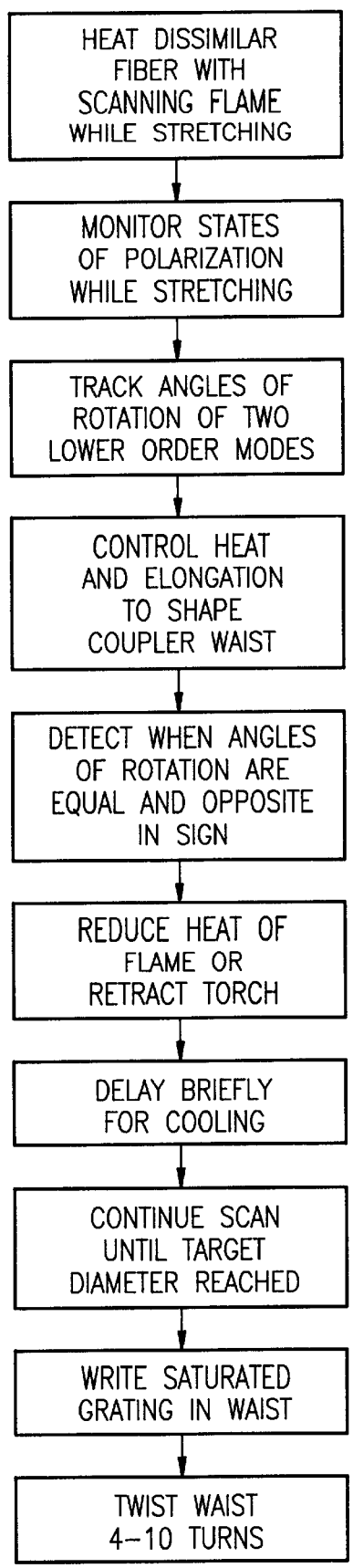
FIG. 2 is a flow chart of a succession of steps used in practicing methods in accordance with the invention.
Figure 3:
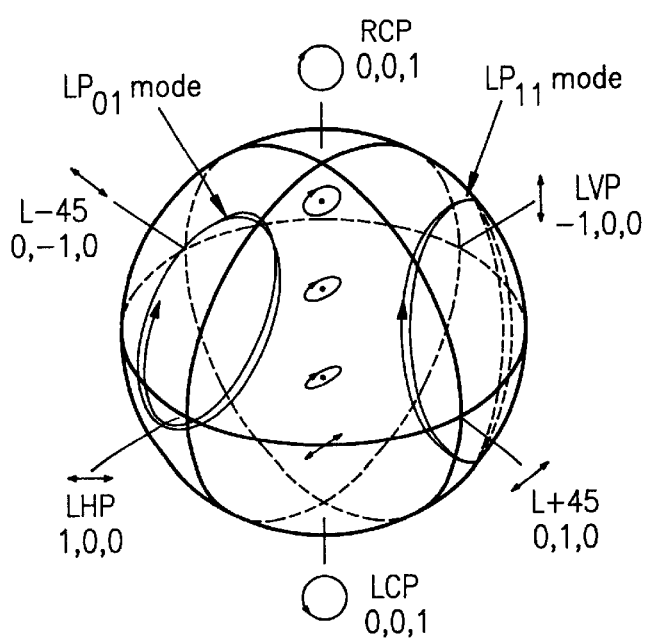
FIG. 3 is a graphical illustration of the Ponicaré sphere representation of the state of polarization.

As seen in the flow diagram of FIG. 2, depicting successive steps in the procedure, the readings of different states of polarization are used to track the two angles of rotation of the two lowest order modes in the coupler waist on the Ponicaré sphere, as depicted in FIG. 3. The angle of rotation of the lowest order mode is traced, both in dimension and in sign, on the Ponicaré sphere, this being recognized as the $LP_{01}$ mode described in the Kewitsch et al patent. The angle of rotation of the second lowest order mode ($LP_{11}$ mode) is also, and simultaneously, traced in dimension and sign on the Ponicaré sphere. The sign of a clockwise rotation is taken as positive and that of a counterclockwise rotation as negative. When the first and second angles of rotation are equal and opposite in sign to one another, the precise form factor for the fused fibers in the coupler has been established. The heating by the torch is then reduced, or the torch is retracted, at the end point of the then ongoing scan. After a delay to allow cooling the elongation is resumed and continued until the final desired length of waist region is reached. The form factor is preserved even though the fiber waist is kept sufficiently plastic for stretching to be completed.

Control of the fabrication process as previously described provides significant reduction in PMD values, but the trend towards data rates of multi-Gigabit per second necessitates the use of methods that enable a bigger suppression of PMD. Typically, by using the fabrication control method disclosed herein the difference between the magnitudes of the retardations of the two channels can be made smaller than 3 radians. This ensures that the coupler PMD will remain less than 5 psec.

Figure 11:
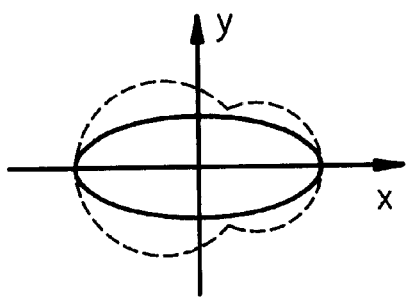
FIG. 11 is a graphical depiction of intensity distribution in different submodes excited in an asymmetric coupler.
Figure 11:
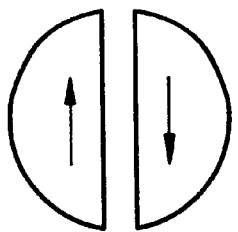
Figure 11:
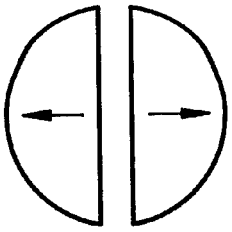
Figure 11:
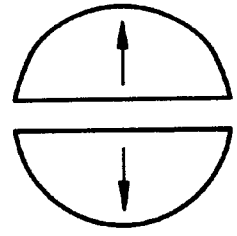
Figure 11:
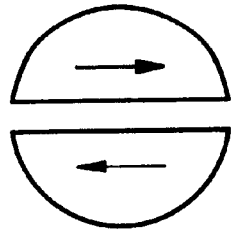

The following is provided to supplement the technical discussion in the Kewitsch et al patent. The diameter of the coupler waist 12 is typically 5 to 10 μm. Therefore, at its waist the coupler does not behave as two coupled waveguides but rather as a single step index waveguide. When light propagates through the device in either of its channels its optical mode is adiabatically transformed from the input optical mode to a waist optical mode and back to the original optical mode via the tapered transition sections 18. The coupler 10 is designed so that the waist modes that are excited by the input modes are the first and the second waveguide modes, $LP_{01}$ and $LP_{11}$ respectively (as seen in FIG. 11). Due to the dissimilarity of the fibers the input mode of each channel evolves into a different waist mode. The prior example of the evolution of birefringence in the two channels during the fusion process is repeated in FIG. 6. At the beginning of the process the separation between the cores of the two fibers is 125 microns, so that the field that propagates in one fiber is not affected by the other fiber. Therefore, the birefringence in both channels is very small. As the process progresses the fibers are merged into each other and at the same time stretched so their cores become closer, and increasingly merge, as seen in the figure. This results in an increase in the birefringence of the two channels since more energy from one fiber is now propagating in the cladding of the other fiber and the effective index of refraction becomes increasingly polarization dependent. Since the coupling between the two fibers is still small the increase in birefringence in both of them is approximately equal. As the cores become smaller and closer, the waist can no longer be treated as two partially overlapping fibers but rather as a compound waveguide. Due to the dissimilarity of the channels, each one of them evolves into modes in the waist region, so they exhibit different birefringence.

The Ponicaré sphere representation of polarized light, depicted in FIG. 3, is an effective way of visualizing the transformation of the state of polarization upon propagation through birefringent optical systems. For a complete description, see Derickson, Chapter 6, Polarization Measurements, of "Fiber Optic Test and Measurement," referred to above. The state of polarization (when the degree of polarization is 100%) is represented by a point of the surface of the Ponicaré sphere. A right circular SOP is located at the upper pole of the sphere, and the left circular SOP is located at the lower pole of the sphere. Elliptical states of polarization are located between the equator and the poles, and linear states of polarization are located at the equator. The birefringences of the $LP_{01}$ and $LP_{11}$ modes are tracked by monitoring the angles of rotation of the states of polarization as they rotate on the surface of the Poincare sphere. In general, the trajectories of the states of polarization vary from device to device because the initial state of polarization is dependent on the somewhat random placement of the input and output fibers attached to the coupling region. The fibers are not polarization maintaining, so the state of polarization of the laser source 45 is not preserved at the coupler 12. The calculation of the angle is done numerically by processing the change in the Stokes parameters (see Derickson, supra, p. 226) of the states of polarization.

To obtain an additional reduction in the coupler PMD the coupler is twisted in its waist 5–15 turns as depicted in FIG.

7. In general, it is desirable to keep the number of turns as small as possible to avoid impairing the mechanical strength of the coupler. To determine the optimal number of turns a new theoretical model and a related numerical simulation are used. The model is based on the theory of coupled modes. It describes the interaction between four modes: namely, the x and y-polarized forward propagating modes and the x and y-polarized backward propagating modes. According to the theory the transfer of energy between the modes is described by a set of four coupled differential equations. Our computer simulation numerically solves this set of equations and determines the transfer characteristics of the twisted coupler as well as its PMD.

Figure 8:
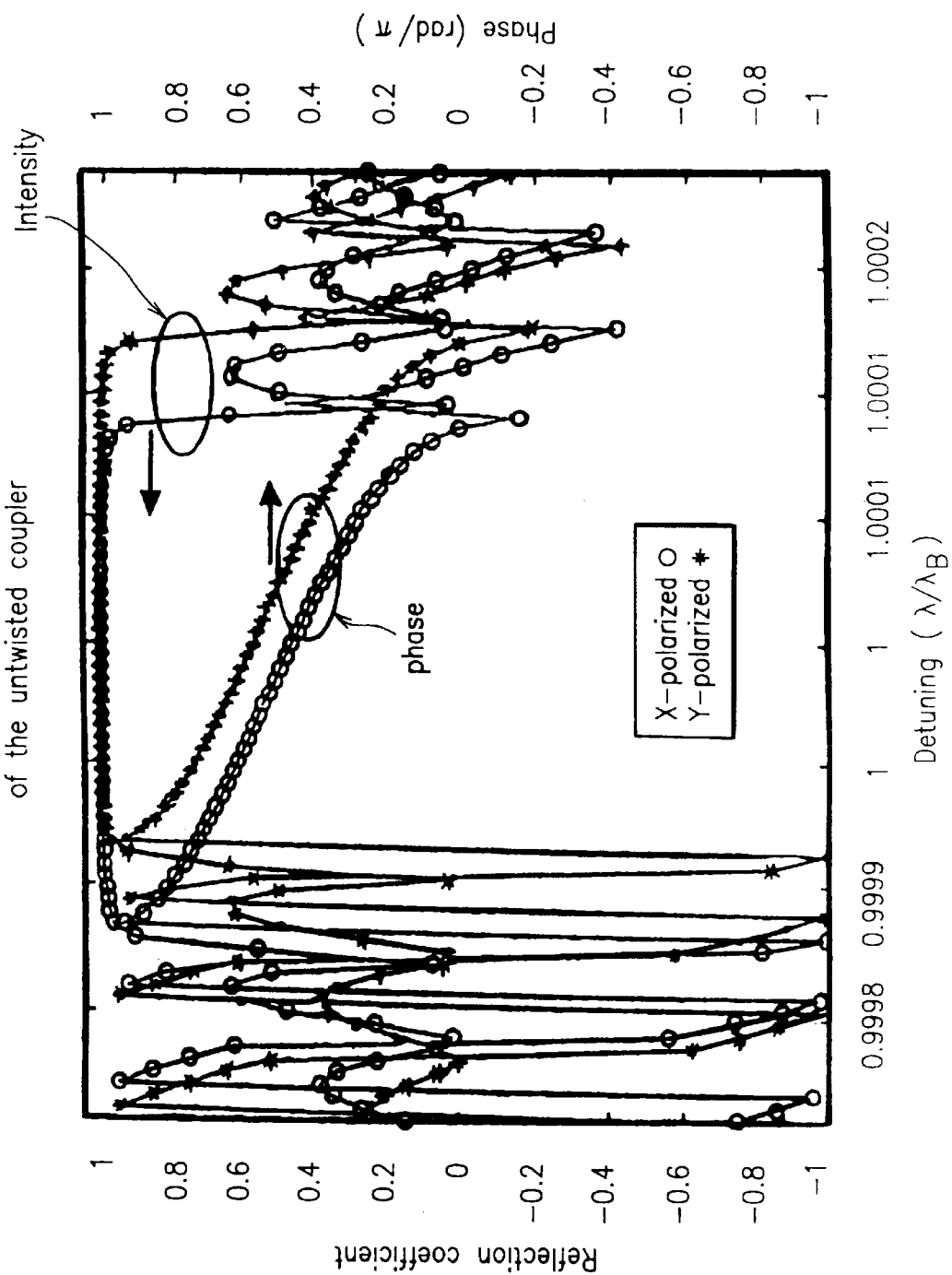
FIG. 8 is a graph of amplitude and phase response for principal polarization states in a coupler having no twist.
Figure 9:
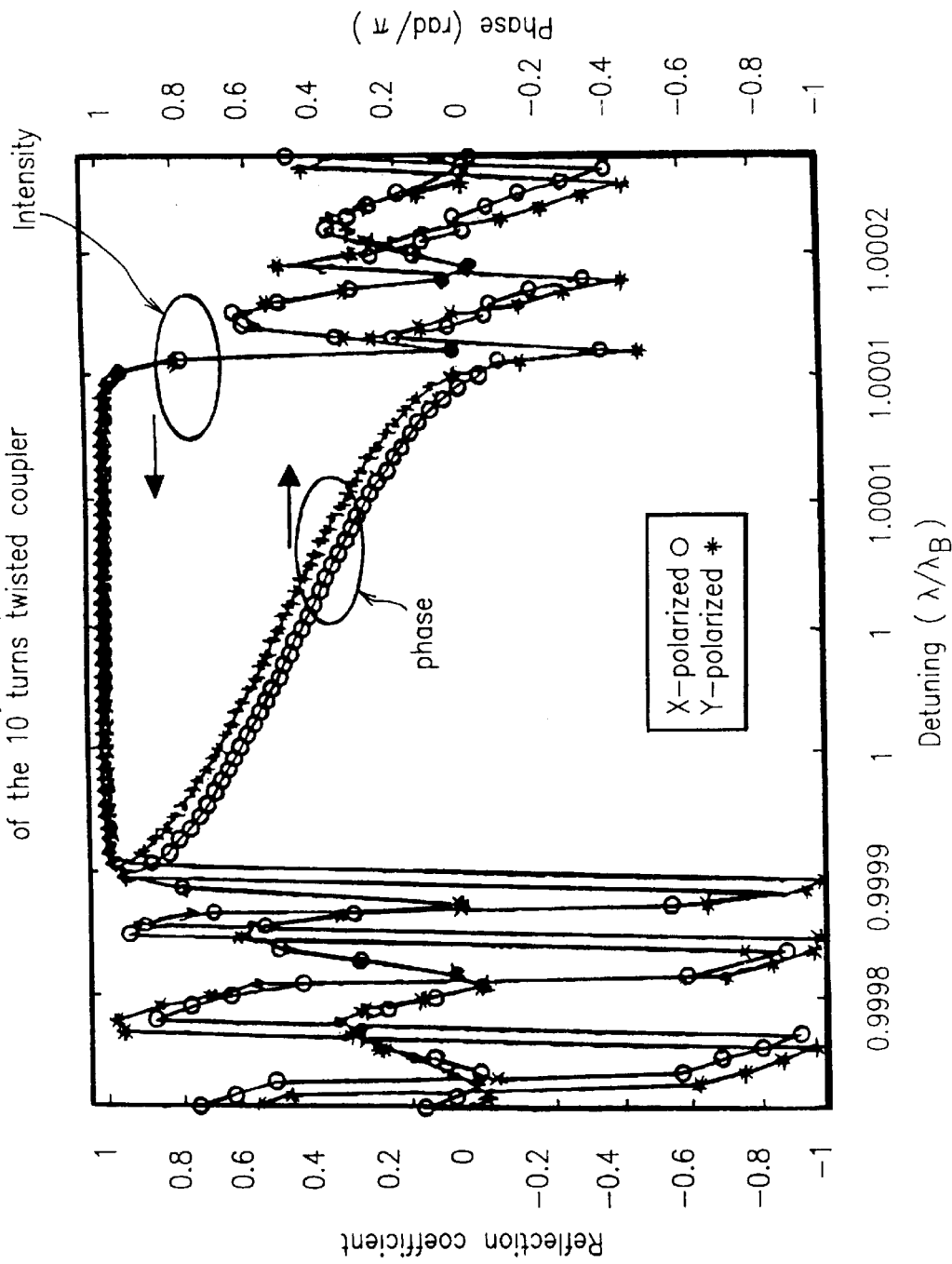
FIG. 9 is a graph of amplitude and phase response for principal polarization states in a coupler having 10 turns of twist.

The amplitude and phase response of the coupler for the two principal polarization states without twist and after a twist of 10 turns are plotted in FIGS. 8 and 9, respectively. The effect of birefringence is clearly seen in the untwisted coupler (FIG. 8). The amplitude (intensity) and phase responses that correspond to the two PSPs are wavelength shifted with respect to one another. As can be seen in FIG. 9, the shift is significantly reduced after a twist of 10 turns. It is important to notice that while the splitting in the amplitude responses has almost disappeared, the phase splitting is still visible in FIG. 9. This fact is one of the reasons why the reduction of PMD as compared to the reduction of the polarization dependence of the amplitude response demands a significantly finer adjustment of the polarization splitting. The PMD at the upper edge of the coupler passband (the passband is commonly defined as a wavelength region, 0.4 nm wide and centered at the grating center wavelength), as a function of the number of turns is plotted in FIG. 10. It can be seen that the twisting of the coupler waist reduces the PMD from few psec in the untwisted coupler to below 0.5 psec after 10 turns.

FIG. 9 displays another important characteristic of the phase response of the coupler: it increasingly deviates from linearity as the wavelength detunes from the center wavelength. Nonlinear phase is the cause for chromatic dispersion (CD), which may lead to pulse broadening in digital communication systems and to signal distortion in analog systems. Additionally, in conjunction with polarization splitting, CD leads to PMD. Thus, it is important to reduce the level of CD in the coupler passband.

Figure 4:
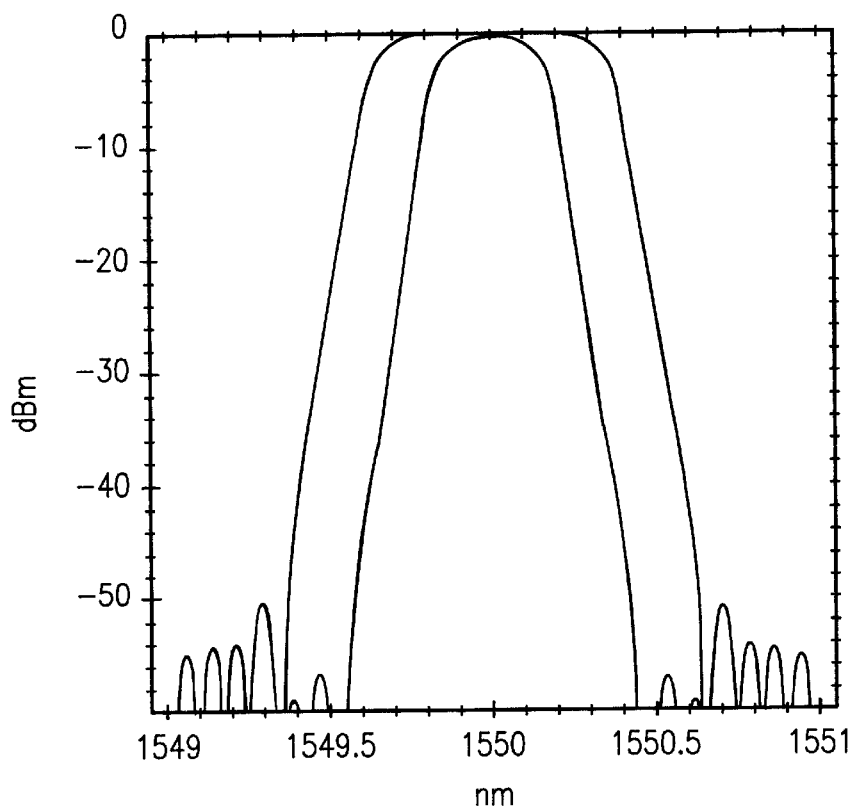
FIG. 4 is a graphical depiction of the add/drop characteristics of a saturated grating having a passband centered at 1550 nm.

We achieve this reduction by increasing the amplitude of the index of refraction grating that is imprinted in the waist of the coupler, as shown in the final step of FIG. 2, prior to use of twist. The grating is imprinted to a sufficient index of refraction strength to produce a substantially flat add/drop passband characteristic, as seen in FIG. 4. With a center wavelength of 1550 nm, the more fully saturated grating has a wider add/drop passband and a flattened maximum (outer curve is FIG. 4). The maximum CD in the passband as a function of the amplitude of the grating is plotted in FIG. 5, in which the significant decrease in the CD as the grating amplitude is increased is clearly seen.

Theoretical Background Polarization Mode Dispersion

Polarization Mode Dispersion (PMD) refers to a dependency of the group velocity of light on its state of polarization (SOP). Ideally, the fundamental modes in a single mode (SM) fiber, $HE_{11}^x$ and $HE_{11}^y$, are degenerate and their propagation characteristics are identical. In actual SM fibers this degeneracy is lifted. Due to deviations of the core from circular symmetry, as well as the presence of intrinsic and extrinsic stresses, typical SM fibers are birefringent (meaning that their refraction index is polarization dependent). The presence of birefringence leads to the phenomenon of PMD. In general, when a light-pulse is transmitted through a polarization-dispersive medium it is distorted. However, it was shown that one can always find two special polarization states that when a light-pulse is aligned with either of them, at the input of the medium, it will emerge at the output undistorted (assuming the absence of chromatic dispersion and second order effects of PMD). These special polarization states are called the Principal States of Polarization (PSPs) and are a very useful tool in the analysis of PMD. The group propagation delays associated with the PSPs correspond to the longest and shortest time delays. The difference between the group delays associated with the PSPs is called the Differential Group Delay (DGD) and is commonly used as a measure of PMD. The DGD in long single mode fibers is proportional to the square root of the fiber length and is typically in the range of $0.1 \cdot 10^{-12}$ to $1 \cdot 10^{-12}$ sec/$\sqrt{km}$. In short single mode fibers PMD scales linearly with length and is typically in the range of $1 \cdot 10^{-15}$ sec/m.

Origin of PMD in Grating Assisted Couplers

The grating assisted coupler of primary concern here couples narrowband light at a predetermined wavelength between two or more dissimilar photosensitive optical fibers using an index of refraction grating impressed in the coupling region to redirect light from one fiber to another. The length of the fused region is about 4 cm. A piece of similar length photosensitive fiber typically has negligible DGD (about $1 \cdot 10^{-17}$ sec). The conventional grating assisted coupler, however, may have PMD in the range of few psec or more, namely, about four orders of magnitude higher than that of the fiber that is used. This undesired phenomenon arises from the combination of two effects: The cross-section of the fused region produces form birefringence. Due to that, the phase (and group) velocity of the optical modes that propagate in the fused region become polarization dependent, namely they experience birefringence. Typically, the birefringence experienced by the two lowest order optical modes is not higher than $\Delta n \approx 1 \cdot 10^{-4}$, which corresponds to a DGD of approximately $10^{-14}$ sec over the 4 cm length of the fused region. Thus, the presence of high birefringence alone can not account for the high values of PMD that are observed in conventional grating assisted couplers. The second contributing effect is due to the presence of the grating. Qualitatively, the light which is coupled by the grating from one fiber to the other experiences multiple reflections inside the grating and the grating possesses a wavelength dependent phase response. The group delay of the reflected light exhibits an approximately quadratic up characteristic with respect to wavelength. The group delay achieves a minimum at the center of the channel passband. The combined effect of a non-zero difference in birefringence for the two modes of the fused region causes the group delay characteristics to become polarization dependent; that is, the wavelength of this minimum group delay for, say, X polarized light is shifted in wavelength from the corresponding point for Y polarized light. This polarization dependence of the group delay, equal to the difference in group delay of two shifted quadratics, corresponds identically to the PMD measured in ps.

When the cores in the fibers in the waist region are reduced to a sub-micron radius, light is no longer confined to the core but rather it propagates in the clad region. At this stage, confinement is achieved due to the index difference between the glass-waist and the air surrounding the waist so that the fused region behaves like a glass-core/air-clad waveguide. The light in the pretapered fiber excites the waist $LP_{11}$ mode and light in the non-pretapered fiber excites the $LP_{01}$ mode (We use the LP -mode designation for waveguides with a circular or elliptical cross sections, an approximation utilized because of the computational simplification it offers). In a circular waveguide the $LP_{11}$ mode is fourfold degenerate. Due to the non-circularity of the waist this degeneracy is lifted and the $LP_{11}$ mode splits into four sub-modes with similar propagation constants. The intensity distributions of these four modes are plotted in FIG. 11. In the device we describe only the two even modes, $LP_{11}^{ey}$ and $LP_{11}^{ex}$, which are excited.

The birefringence of these modes (the difference between their effective refractive index) is of opposite sign compared to their corresponding $LP_{01}$ modes ($LP_{01}^{y}$ and $LP_{01}^{x}$). Accordingly, referring again to FIG. 6, the measured birefringence in the pretapered fiber becomes negative at point 'a'. At point 'b' the two channels have birefringence of equal magnitude and opposite signs. As described above, at this point the coupler's PMD reaches a minimum for this method of analysis.

The center of the reflection band of a Bragg grating is determined by the Bragg condition: $|\beta_1|+|\beta_2|=2\pi/\Lambda_g$, where $\beta_1$ and $\beta_2$ are the propagation constants of the incident and reflected modes respectively and $\Lambda_g$ is the grating period. The presence of birefringence lifts the polarization degeneracy of the Bragg condition so that the Bragg wavelength is split into two different Bragg wavelengths for the two orthogonal polarizations. In this case the Bragg condition for an x-polarized light is $|\beta_{1x}|+|\beta_{2x}|=2\pi/\Lambda_g$ and for y-polarized light $|\beta_{1y}|+|\beta_{2y}|=2\pi/\Lambda_g$ In general, these two conditions are satisfied at different wavelengths. This results in a polarization splitting of the drop's reflection intensity and phase responses. Reflection intensity and phase as function of wavelength for x and y-polarized lightwaves propagating through a birefringent Bragg grating are plotted in FIG. 3. It can be seen that the intensity and phase associated with the y-polarized light is a shifted version of the intensity and phase associated with the x-polarized light. The propagation constant is related to the wavelength $\lambda$ by: $\beta=2\pi n_{eff}/\lambda$ where $n_{eff}$ is the effective refraction index. The spectral splitting, $\Delta\lambda_B$, can be found from the above Bragg condition in terms of the modal birefringence ($\Delta n \equiv n_{effy}-n_{effx}$):

$$\Delta\lambda_B = \Lambda_g(\Delta n_1 + \Delta n_2)$$

Denoting the phases of the x-polarized and y-polarized reflected light as $\phi_x$ and $\phi_y$ respectively, the corresponding group delays are given by $\phi'_x$ and $\phi'_y$ where the prime denotes differentiation with respect to the optical frequency. The difference between the group delays is then:

$$DGD = \varphi'_y - \varphi'_x \approx \frac{2\pi c}{\lambda^2} \cdot \Delta\lambda_B \cdot \varphi''_x \quad (2)$$

Since the phase of the reflection coefficient is in general a non-linear function of the optical frequency DGD will deviate from zero, namely the coupler will exhibit PMD. It is clear from equation (2) that the PMD can be reduced if the birefringence-induced spectral-splitting, $\Delta\lambda_B$, is reduced. This can be performed by controlling the birefringence of the coupler during fabrication. From equation (1) it can be seen that if $\Delta n_1 = -\Delta n_2$ then $\Delta\lambda_B$ essentially vanishes. This condition is that satisfied at point b in FIG. 6. The second derivative of the phase with respect to the optical frequency, $\phi''_x$, in equation (2) is directly related to the CD experienced by the transmitted light. Clearly, therefore, PMD can be minimized by minimizing the CD.

Measurement of Birefringence Evolution During the Fabrication Process

The method used for monitoring the coupler birefringence during its fabrication uses the so-called Jones calculus. It is a mathematical formalism used for the analysis of polarization dependent phenomena. According to Jones notation a monochromatic electric field is described by a two element complex vector: $\vec{E}=[E_x e^{i\phi_x} \; E_y e^{i\phi_y}]^T$ where $E_x$ and $\phi_x$ are respectively the amplitude and the phase of the x component of the electric field, $E_y$ and $\phi_y$ defined similarly and $[\;]^T$ denotes vector transposition. The time dependency of the field is given by: $Re\{\vec{E}e^{i\omega}$ where $\omega$ is the optical frequency. The state of polarization (SOP) of the field is completely defined by the ratio:

$$\chi = \frac{E_y e^{i\varphi_y}}{E_x e^{i\varphi_x}} \quad (3)$$

Thus the Jones vector can be written as:

$$\vec{E} \equiv E e^{j\varphi} \hat{\varepsilon} \text{ where } \hat{\varepsilon} \equiv \frac{1}{\sqrt{1+|\chi|^2}} \begin{bmatrix} 1 \\ \chi \end{bmatrix} \quad (4)$$

Where E and $\bar{\phi}$ are respectively the amplitude and the common phase of the field and $\hat{\epsilon}$ is a unit Jones vector. The Jones matrix, T, of a given transmission-medium is a transformation matrix that describes the relation between the input electric field and the output electric field. Let $\vec{E}_{in}=[E_{in}^x e^{i\phi_{in}x} \; E_{in}^y e^{i\phi_{in}y}]^T$ describe the field at the input of the medium than the output field is given by:

$$\vec{E}_{out} = \begin{bmatrix} E_{out}^x e^{i\varphi_{out}^x} \\ E_{out}^y e^{i\varphi_{out}^y} \end{bmatrix} = T\vec{E}_{in} \quad (5)$$

The Jones matrix of a lossless medium is unitary. The eigen-states of such a medium are orthogonal and the corresponding eigen-values have unit magnitude. Hence, the eigen-values can be described by: $e^{i\alpha_\pm}$. The retardation is defined by the phase difference between the eigen polarization states:

$$b \equiv \alpha_+ - \alpha_- \quad (6)$$

It is convenient to normalize T in the following manner:

$$T_n \equiv \frac{T}{t_{22}} \equiv \begin{bmatrix} t_{11}/t_{22} & t_{12}/t_{22} \\ t_{21}/t_{22} & 1 \end{bmatrix} \quad (7)$$

The phase difference between the eigen-values of T and the phase difference between the eigen-values of $T_n$ are the same. Thus to find the retardation it is sufficient to measure $T_n$. A setup for measurement of $T_n$ is that generally presented as the polarization analyzer 40 in FIG. 1. With the aid of three internal polarizers the polarization analyzer (LPA) 40 sets three different input SOPs, $\hat{\epsilon}_k^{in}$ (k=1,2,3), at the input of the medium. For each input SOP the corresponding output SOP, $\hat{\epsilon}_k^{out}$, is measured with the internal polarimeter. Then the following set of linear equations is solved to obtain the components of $T_n$:

$$\hat{\epsilon}_k^{out} = T_n \hat{\epsilon}_k^{in} \quad (8)$$

Since we are interested in monitoring the birefringence in the fused region we need to eliminate the effect of the optical fibers leading to this region. We assume that the Jones matrices of the fibers that lead to/from the fusion region, A and C respectively (FIG. 1), remain constant during the production process. The Jones matrix that is measured by the LPA is thus:

$$T_{total}(t) = CB(t)A \quad (9)$$

At the beginning of the production process the fusion region can be assumed to have no birefringence so we can write: $T_0 \equiv T_{total}(0) = CA$. We then use $T_0$ to normalize our measurements as follows:

$$T_{normalized}(t) = T_0^{-1} T_{total}(t) = A^{-1} B(t) A \quad (10)$$

According to (10) the matrices $T_{normalized}(t)$ and $B(t)$ are related through a similarity transformation and thus they have the same eigen-values. Hence, we can use $T_{normalized}(t)$ to calculate the birefringence of the fused region.

Coupled Mode Analysis of the Effect of Twist on PMD

To simplify the analysis we study the effect of twist on a uniform Bragg grating in a single mode fiber. Although this simplified device and our coupler are somewhat different the effect of twist on their PMD properties is similar. The Bragg grating is characterized by its 'dc' and 'ac' coupling coefficients, σ and κ respectively, and the Bragg propagation constant $β_B$. To describe the birefringence of the fiber we denote the difference between the propagation constants of the x-polarized and y-polarized fields prior to the impressing of the grating and the application of twist by γ. The twist rate is denoted by τ and the twist-induced circular birefringence are denoted by s. Let $A_x$ and $A_y$ describe, respectively, the complex amplitude of the x-polarized and y-polarized, forward propagating $LP_{01}$ modes in the single mode fiber. The backward propagating modes $B_x$ and $B_y$ are defined similarly. With these definitions the coupled mode equations take the form:

$$\frac{d\vec{E}}{dz} \equiv \frac{d}{dz}\begin{bmatrix} A_x \\ A_y \\ B_x \\ B_y \end{bmatrix} = G(z)\vec{E} \quad (11)$$

Where:

$$G(z) = \begin{bmatrix} i\sigma + i\frac{\gamma}{2}\cos(2\tau z) & s + i\frac{\gamma}{2}\sin(2\tau z) & i\kappa e^{-i2\delta z} & 0 \\ -s + i\frac{\gamma}{2}\sin(2\tau z) & i\sigma - i\frac{\gamma}{2}\cos(2\tau z) & 0 & i\kappa e^{-i2\delta z} \\ -i\kappa e^{i2\delta z} & 0 & -i\sigma - i\frac{\gamma}{2}\cos(2\tau z) & s - i\frac{\gamma}{2}\sin(2\tau z) \\ 0 & -i\kappa e^{i2\delta z} & -s - i\frac{\gamma}{2}\sin(2\tau z) & -i\sigma + i\frac{\gamma}{2}\cos(2\tau z) \end{bmatrix} \quad (12)$$

Here $\delta \equiv \beta - \delta_B$ is the detuning from the Bragg propagation constant. Eq. (11) and (12) describes a system of coupled linear differential equations with varying coefficients. Significant simplification of this system can be achieved by using a transformed coordinate system described by the transformation matrix:

$$R(z) = \begin{bmatrix} e^{i\delta z}\cos(\tau z) & e^{i\delta z}\sin(\tau z) & 0 & 0 \\ -e^{i\delta z}\sin(\tau z) & e^{i\delta z}\cos(\tau z) & 0 & 0 \\ 0 & 0 & e^{-i\delta z}\cos(\tau z) & e^{-i\delta z}\sin(\tau z) \\ 0 & 0 & -e^{-i\delta z}\sin(\tau z) & e^{-i\delta z}\cos(\tau z) \end{bmatrix} \quad (13)$$

This z-dependent transformation is a combination of two transformations. One is a transformation into a rotating coordinate system that is aligned with the local axes of birefringence. The other transformation does not have a simple physical interpretation but it eliminates the z-dependent exponential terms in (12). The transformed system of equations is then:

$$\frac{d\tilde{E}}{dz} = \left[\frac{dR}{dz}R^{-1} + RGR^{-1}\right]\tilde{E} = \tilde{G}\tilde{E}, \text{ where } \tilde{E} \equiv R\vec{E} \quad (14)$$

Where $\tilde{G}$ is given by:

$$\tilde{G}(z) = \begin{bmatrix} i\left(\sigma + \frac{\gamma}{2}\right) & s + \tau & i\kappa & 0 \\ -(s+\tau) & i\left(\sigma - \frac{\gamma}{2}\right) & 0 & i\kappa \\ -i\kappa & 0 & -i\left(\sigma + \frac{\gamma}{2}\right) & (s+\tau) \\ 0 & -i\kappa & -(s+\tau) & -i\left(\sigma - \frac{\gamma}{2}\right) \end{bmatrix} \quad (15)$$

In the case of a uniform grating $\tilde{G}$ is a z-independent matrix and equation 14 can be analytically integrated. The complex amplitudes of the modes in terms of their value at z=0 is given by:

$$\vec{E}(z) = R^{-1}(z)\exp(\tilde{G}z)R(z)\vec{E}(0) = M(z)\vec{E}(0) \quad (16)$$

We assume that the grating is of length L and write M(L) as a block matrix composed from four 2×2 sub-matrices, $m_j$. We then obtain:

$$\begin{bmatrix} \vec{A}(L) \\ \vec{B}(L) \end{bmatrix} = \begin{bmatrix} m_1 & m_2 \\ m_3 & m_4 \end{bmatrix}\begin{bmatrix} \vec{A}(0) \\ \vec{B}(0) \end{bmatrix} \quad (17)$$

$$\text{where } \vec{A} \equiv \begin{bmatrix} A_x \\ A_y \end{bmatrix} \text{ and } \vec{B} \equiv \begin{bmatrix} B_x \\ B_y \end{bmatrix}$$

Figure 10:
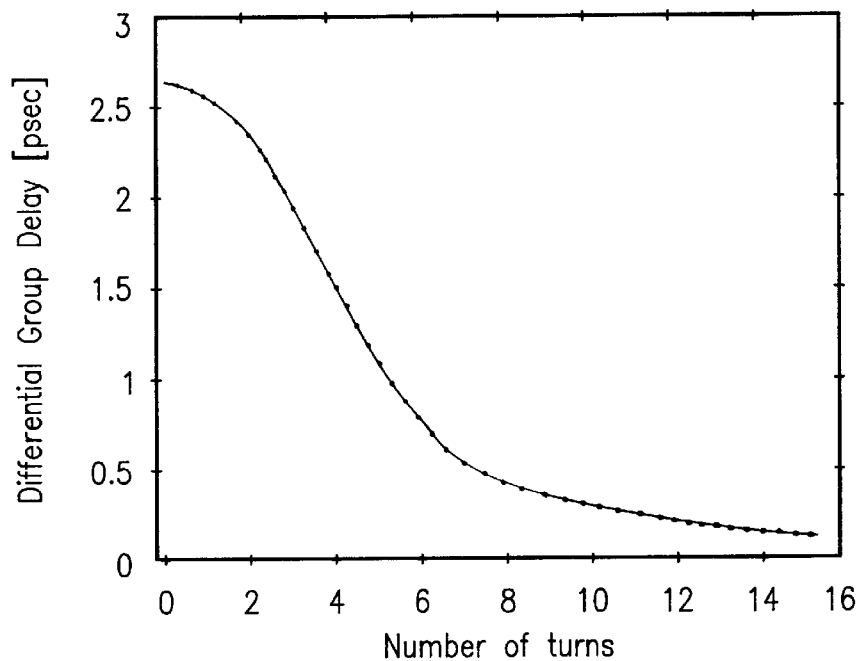
FIG. 10 is a graph of differential group delay in a twisted coupler as a function of the number of turns.

The Jones matrix that corresponds to the reflection and transmission, $J_r$ and $J_t$ respectively are then given by: $J_r = -m_4^{-1}m_3$ and $J_t = m_1 - m_2 m_4^{-1} m_3$. The principal states of polarization and the differential group delay for the reflection and transmission are then found from the corresponding Jones matrices and their frequency derivatives in the usual manner. If the grating is not uniform we represent the grating as a concatenation of uniform gratings and the matrices M(L) is found from the product of these matrices. Based on the development of these now theoretical tools for the analysis of twisted couplers, the described techniques for minimizing PMD have been devised. FIG. 10 illustrates that the group delay is significantly reduced for eight complete turns; further rotations have a much smaller effect on DGD and can potentially compromise calculated intensity and phase spectral response is illustrated in FIGS. 8 and 9. the difference in phase response for X and Y polarized light decreases with twist, and the intensity responses for X and Y polarized light become indistinguishable, hence the polarization splitting is nearly zero.

Given that a considerable number of alternatives and expedients have been presented, it will be appreciated that the invention is not limited thereto by encompasses all forms and variations within the scope of the appended claims.

What is claimed is:

1. The method of providing a grating assisted fused fiber optical filter having both low polarization mode dispersion and chromatic dispersion comprising the steps of:

elongating fibers that are to be fused together along a grating region by locally heating the fibers under tension in scanning fashion;

monitoring the states of polarization of the grating regions by determining angles of rotation of the states of polarization of the two lowest order modes as the fibers are elongated;

modifying the heating when the angles of rotation of the two lowest order modes are equal and opposite;

writing a saturated index of refraction grating in the grating region with substantially flat add/drop passband characteristics, and angularly varying the grating region along its length to reduce polarization splitting of a selected minimum wavelength differential.

2. The method as set forth in claim 1 above, wherein the step of elongating comprises modifying the cross-sectional shape of fibers in the grating region during elongation, the step of modifying the heating comprises reducing the local heating during elongation, the step of writing comprises flattening the chromatic dispersion response by providing a variation in the passband of less than 100 ps/nm in peak to peak amplitude, and the step of angularly varying the grating region comprises twisting the grating region four to ten turns.

3. The method as set forth in claim 2 above, wherein the step of reducing the heating comprises reducing the heating at the completion of a scan to a level at which the cross-sectional shape of the fibers in the grating region is retained until elongation is complete, and the step of twisting comprises twisting about five turns.

4. The method as set forth in claim 3 above, further including the step of pretapering one of the fibers prior to elongation such as to from an add/drop coupler having dissimilar fibers in the grating region.

* * * * *